United States Patent [19]
Solomon

[11] Patent Number: 5,943,483
[45] Date of Patent: *Aug. 24, 1999

[54] METHOD AND APPARATUS FOR CONTROLLING ACCESS TO A BUS IN A DATA PROCESSING SYSTEM

[75] Inventor: Richard L. Solomon, Colorado Springs, Colo.

[73] Assignee: LSI Logic Corporation, Milpitas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/570,153

[22] Filed: Dec. 11, 1995

[51] Int. Cl.⁶ ..................................................... G06F 13/00
[52] U.S. Cl. ......................... 395/287; 395/288; 395/290; 395/293; 395/306; 395/308
[58] Field of Search .................................. 395/287, 308, 395/800, 725, 726, 288, 650, 293, 733, 290, 306; 364/200, 900

[56] References Cited

U.S. PATENT DOCUMENTS

| | | | |
|---|---|---|---|
| 4,495,571 | 1/1985 | Staplin, Jr. | 364/200 |
| 4,586,128 | 4/1986 | DeWoskin | 364/200 |
| 4,785,394 | 11/1988 | Fischer | 364/200 |
| 5,168,568 | 12/1992 | Thayer et al. | 395/725 |
| 5,237,696 | 8/1993 | Best | 395/725 |
| 5,253,348 | 10/1993 | Scalise | 395/325 |
| 5,257,356 | 10/1993 | Brockmann et al. | 395/725 |
| 5,280,628 | 1/1994 | Nakayama | 395/725 |
| 5,293,621 | 3/1994 | White et al. | 395/650 |
| 5,367,695 | 11/1994 | Narad et al. | 395/800 |
| 5,392,436 | 2/1995 | Jansen et al. | 395/725 |
| 5,418,914 | 5/1995 | Heil et al. | 395/325 |
| 5,471,590 | 11/1995 | Melo et al. | 395/288 |
| 5,544,332 | 8/1996 | Chen | 395/288 |
| 5,555,425 | 9/1996 | Zeller et al. | 395/800 |
| 5,572,734 | 11/1996 | Narad et al. | 395/726 |
| 5,596,729 | 1/1997 | Lester et al. | 395/308 |
| 5,761,445 | 6/1998 | Nguyen | 395/280 |
| 5,764,929 | 6/1998 | Kelley et al. | 395/287 |
| 5,850,530 | 12/1998 | Chen et al. | 395/293 |

*Primary Examiner*—Ayaz R. Sheikh
*Assistant Examiner*—Eric S. Thlang
*Attorney, Agent, or Firm*—Wayne P. Bailey; Duke W. Yee

[57] ABSTRACT

A method and apparatus for controlling access to a bus. A target having a period of unavailability is identified. A master device requesting access to the bus to initiate a data transfer between the master device and the target device also is identified. The master device is denied access to the bus for a delay period in response to the master device attempting to retry a data transfer with the target device, wherein the delay period is a time period after which the target device becomes available for additional transfers, wherein the bus is available to other master devices during the delay period.

20 Claims, 8 Drawing Sheets

METHOD AND APPARATUS FOR CONTROLLING ACCESS TO A BUS IN A DATA PROCESSING SYSTEM

BACKGROUND OF THE INVENTION

1. Technical Field

The present invention relates generally to an improved data processing system and in particular, to an improved method and apparatus for transferring data across a bus in a data processing system. Still more particularly, the present invention relates to a method and apparatus for transferring data across a bus using intelligent bus arbitration.

2. Description of the Related Art

In computer systems, a bus is a means by which electrical signals are communicated back and forth between a central processor, memory, and other devices, such as input and output adapters. In a single processor data processing system, the bus may be a simple plurality of electrical conductors linking the various components of the system. In multiple processor and other more sophisticated computer systems, however, the bus may become more complex and play an active role in directing the various signals between the components of the computer system. In particular, multi-processor data processing systems are characterized by a plurality of processors, which function as master devices and share a common bus.

Additionally, these systems include a plurality of input/output devices, which function as slaves, and also share the common bus so that masters and slaves may communicate with one another. In such a system, only one master device and one slave device may communicate with each other at any given point in time. In this type of system, the bus architecture allows more than one device to control or gain ownership of the bus. A mechanism must exist to decide which device is permitted ownership of the bus at any particular time. Most often, a scheme known as "arbitration" is employed to determine which device will be the next bus owner. The decision as to who will be the next bus owner is made using various arbitration methods, such as, for example, assigning a priority to each of the competing master devices. Irrespective of the particular arbitration method employed, a problem arises when a slave device selected by the master device to perform a data transfer is either busy or slow to respond. Typically, one of a number of priority-based schemes are employed for determining what device should next be granted the bus. The presently available methods are effective at dividing up bus bandwidth, but do nothing to improve the bandwidth.

Some devices frequently enter a state of long duration in which they generate a bus retry in response to any attempted transaction. Since the master device initiating the retry transfer continues attempting to successfully complete that transfer, the bus experiences retries for a large number of consecutive accesses. This behavior consumes valuable bus bandwidth in an extremely inefficient manner. Additionally, most modern buses are oriented towards large burst transfers because arbitration bus-on and bus-off protocols consume relatively large amounts of time. A retry, in which no data is actually transferred, but at the full arbitration bus-on and bus-off costs, is a wasteful transaction. In lightly loaded or single initiator systems containing few or only a single master device, this is of little or no consequence because the bus is not being or cannot be used by other devices. In heavily loaded systems containing multiple master devices, this type of arbitration reduces the amount of bandwidth available to other devices. Therefore, it would be advantageous to have a method and apparatus for increasing the bandwidth available to other devices in data processing systems containing devices that enter a long state of unavailability.

SUMMARY OF THE INVENTION

The present invention provides a method and apparatus for controlling access to a bus. Target devices having a period of unavailability are identified. A master device requesting access to the bus to initiate a data transfer between the master device and one of said target devices also is identified. The master device is denied access to the bus for a delay period in response to the master device attempting to retry a data transfer with the target device, wherein the delay period is a time period at or after which the target device becomes available for additional transfers, wherein the bus is available to other master devices during the delay period.

The above, as well as additional objectives, features, and advantages of the present invention, will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
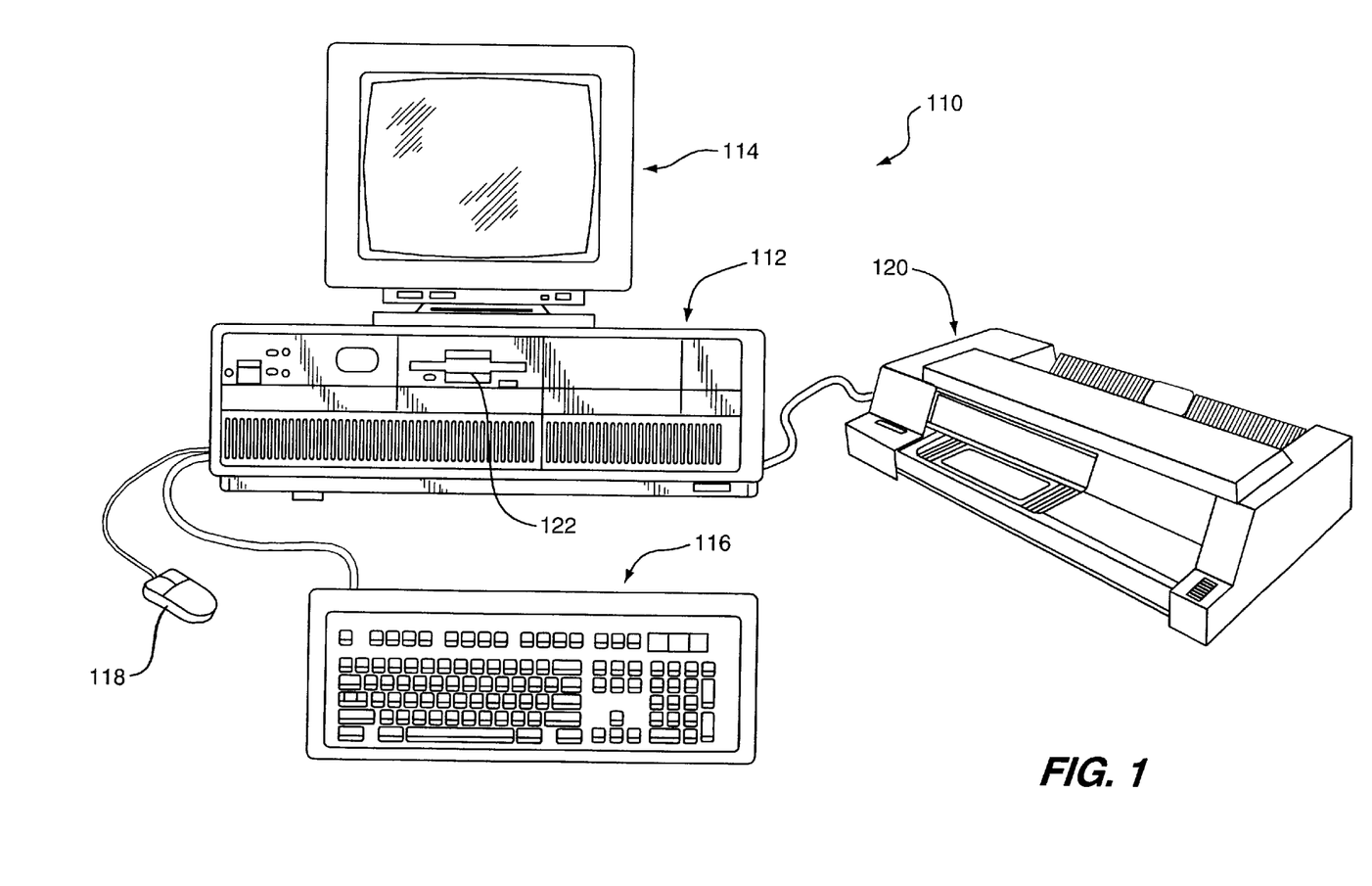
FIG. 1 is a data processing system, personal computer system in which the present invention can be employed.

With reference now to the figures, and in particular with reference to FIG. 1, a data processing system, personal computer system 110, in which the present invention can be employed is depicted. As shown, personal computer system 110 comprises a number of components, which are interconnected together. More particularly, a system unit 112 is coupled to and can drive an optional monitor 114 (such as a conventional video display). A system unit 112 also can be optionally coupled to input devices such as a PC keyboard 116 or a mouse 118. An optional output device, such as a printer 120, also can be connected to the system unit 112. Finally, system unit 112 may include one or more mass storage devices such as floppy diskette drive 122.

System unit 112 responds to input devices, such as PC keyboard 116, the mouse 118, or local area networking interfaces. Additionally, input/output (I/O) devices, such as floppy diskette drive 122, display 114, printer 120, and local area network communications systems are connected to system unit 112 in a manner well known. Of course, those skilled in the art are aware that other conventional components also can be connected to the system unit 112 for interaction therewith. In accordance with the present invention, personal computer system 110 includes a system processor that is interconnected to a random access memory (RAM), a read only memory (ROM), and a plurality of I/O devices.

In normal use, personal computer system 110 can be designed to give independent computing power to a small group of users as a server or a single user and is inexpensively priced for purchase by individuals or small businesses. In operation, the system processor functions under an operating system, such as Microsoft's Windows 95, IBM's OS/2 operating system or Apple Computer Corporation's Mac OS, or DOS. OS/2 is a registered trademark of International Business Machines Corporation. "Mac OS" is a registered trademark of Apple Computer Corporation.

Figure 2:
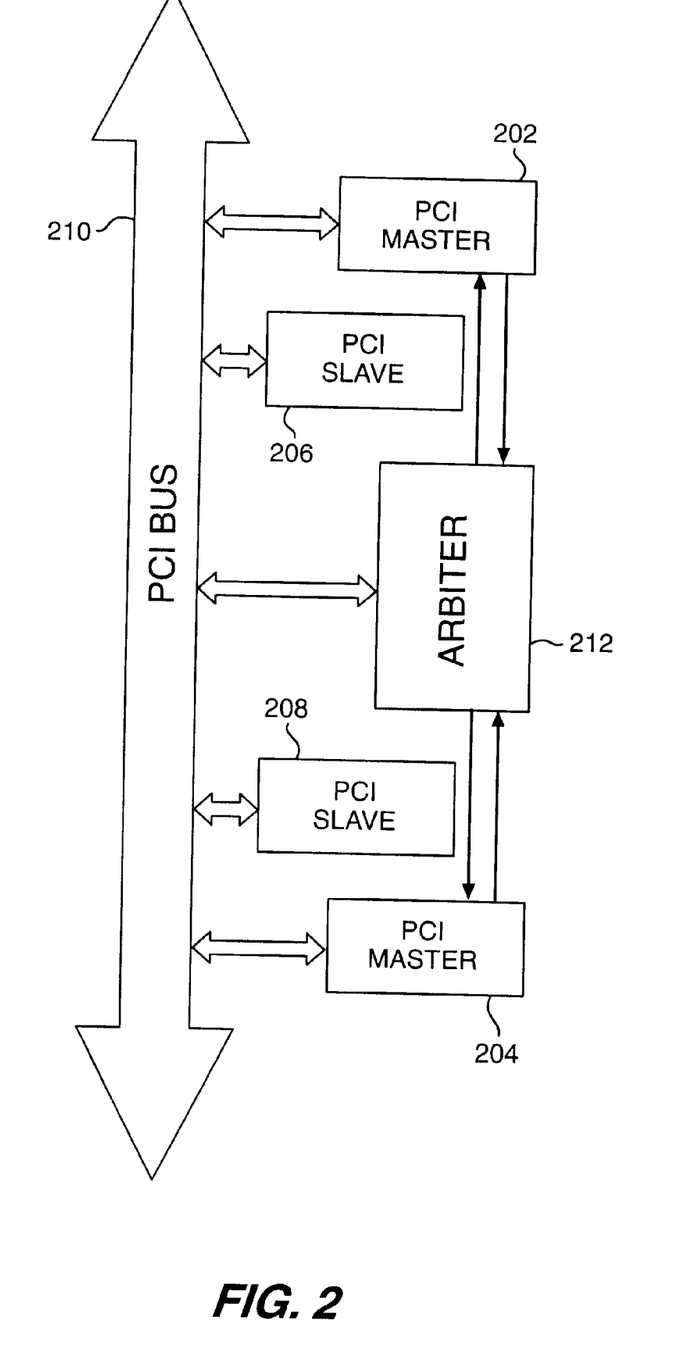
FIG. 2 is a block diagram of a bus system according to the present invention.

With reference now to FIG. 2, a block diagram of a bus system is depicted according to the present invention. In the depicted example, bus system 200 is a Peripheral Component Interconnection (PCI) bus system that includes master devices 202 and 204 and slave devices 206 and 208. These devices are connected to PCI bus 210. Additionally, arbiter 212 is connected to PCI bus 210 and has connections to master devices 202 and 204. Master devices 202 and 204 may be, for example, a graphics card containing a processor, a motion video adapter containing a processor, or an intelligent SCSI host adapter. Slave devices 206 and 208 may be, for example, a hard disk drive controller, or a random access memory device. Although the depicted example only illustrates two master devices and two slave devices, the present invention may be implemented using other numbers of master and slave devices.

According to the present invention, arbiter 212 provides intelligent arbitration that provides for an intelligent retry behavior within the data processing system, containing a device which retries until not busy. With this type of arbitration, bandwidth within the data processing system, is not affected by the busy state of the target device. For example, PCI chip sets exhibit this behavior when a DRAM page boundary is crossed and many other PCI slave devices exhibit such a behavior. According to the present invention, arbiter 212 is made aware of bus states and maintains knowledge of wasteful bus transactions on a per device basis. As a result, arbiter 212 can dynamically or through prior programming determine which target or slave devices are likely to enter a long duration retry state.

Arbiter 212 saves substantial bandwidth by not granting the bus to the initiating device (master device) after the first retry to the slave device until some time delay that is often closely related to the duration of the retry state of the particular device has lapsed. Arbiter 212 may deny any retry to a slave device or deny retries if the slave device has a period of unacceptable availability. A "period of unavailability" is some length of time during which attempts to access a device is unsuccessful. An "unacceptable period of unavailability" occurs when repeated access attempts made during the period of unavailability have an adverse effect on bus bandwidth.

The time delay may be, for example, until the target device is available or some time after the target device becomes available. Since the master device initiating the retried access must (in almost all cases) successfully complete the retried transaction before attempting any other transaction, the arbiter can save substantial bandwidth by not granting the bus to the initiating master device, after the first retry.

Figure 3:
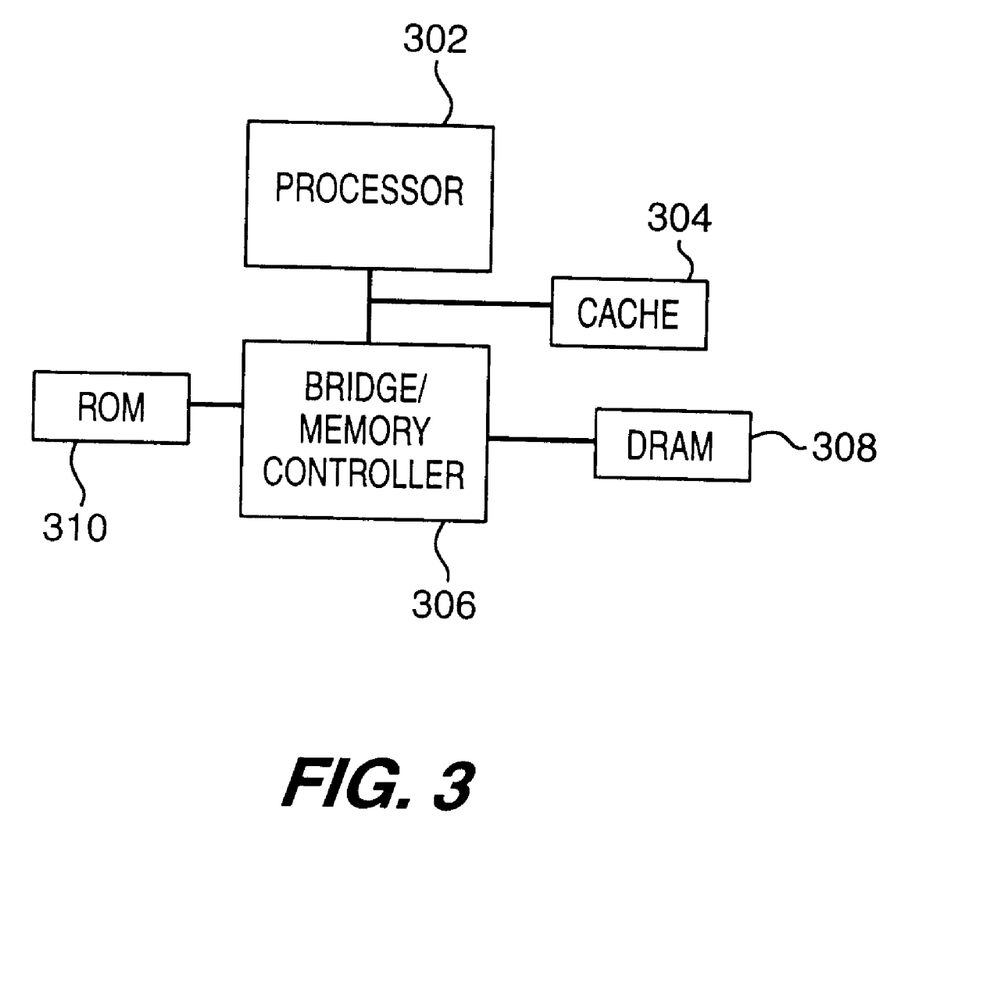
FIG. 3 is a more detailed block diagram of the arbiter from FIG. 2 according to the present invention.

Turning now to FIG. 3, a more detailed block diagram of arbiter 212 from FIG. 2 is depicted according to the present invention. Arbiter 212 may be, for example, but without limitation, all or part of a processor/cache/memory subsystem and a PCI bridge or arbiter 212 may be an application specific integrated chip (ASIC) connected to the PCI bus (not shown). Processor 302 and cache 304 are connected to bridge/memory controller 306. Additionally, dynamic random access memory (DRAM) 308 and read only memory (ROM) 310 also are connected to bridge/memory controller 306.

The functions of arbiter 212 may be provided through all of these components or through the processor located on bridge/memory controller 306. Bridge/memory controller 306 also may include functions such as data buffering and posting along with other PCI central functions.

The processes depicted in FIGS. 4A–7 below may be implemented by those of ordinary skill in the art within the data processing system depicted in FIGS. 1–3. The processes of the present invention also may be implemented in a program storage device that is readable by a data processing system, such as personal computer 110, wherein the program storage device encodes data processing system executable instructions coding for the processes of the present invention. These instructions are read and executed by a processor within the data processing system. The program storage device may take various forms including, for example, but not limited to, a hard disk drive, a floppy disk, an optical disk, a read only memory (ROM), a random access memory (RAM), and an EPROM, which are known to those skilled in the art. The processes stored on a program storage device are dormant until activated by using the program storage device for the data processing system. For example, processes may be stored on DRAM 308 or on ROM 310 and are activated when used in conjunction with processor 302 in FIG. 3. Additionally, these processes may be hardwired into an ASIC or some other form of hardware. For example, an ASIC chip may be located on bridge/memory controller 306 to provide the processes of the present invention.

Figure 4A:
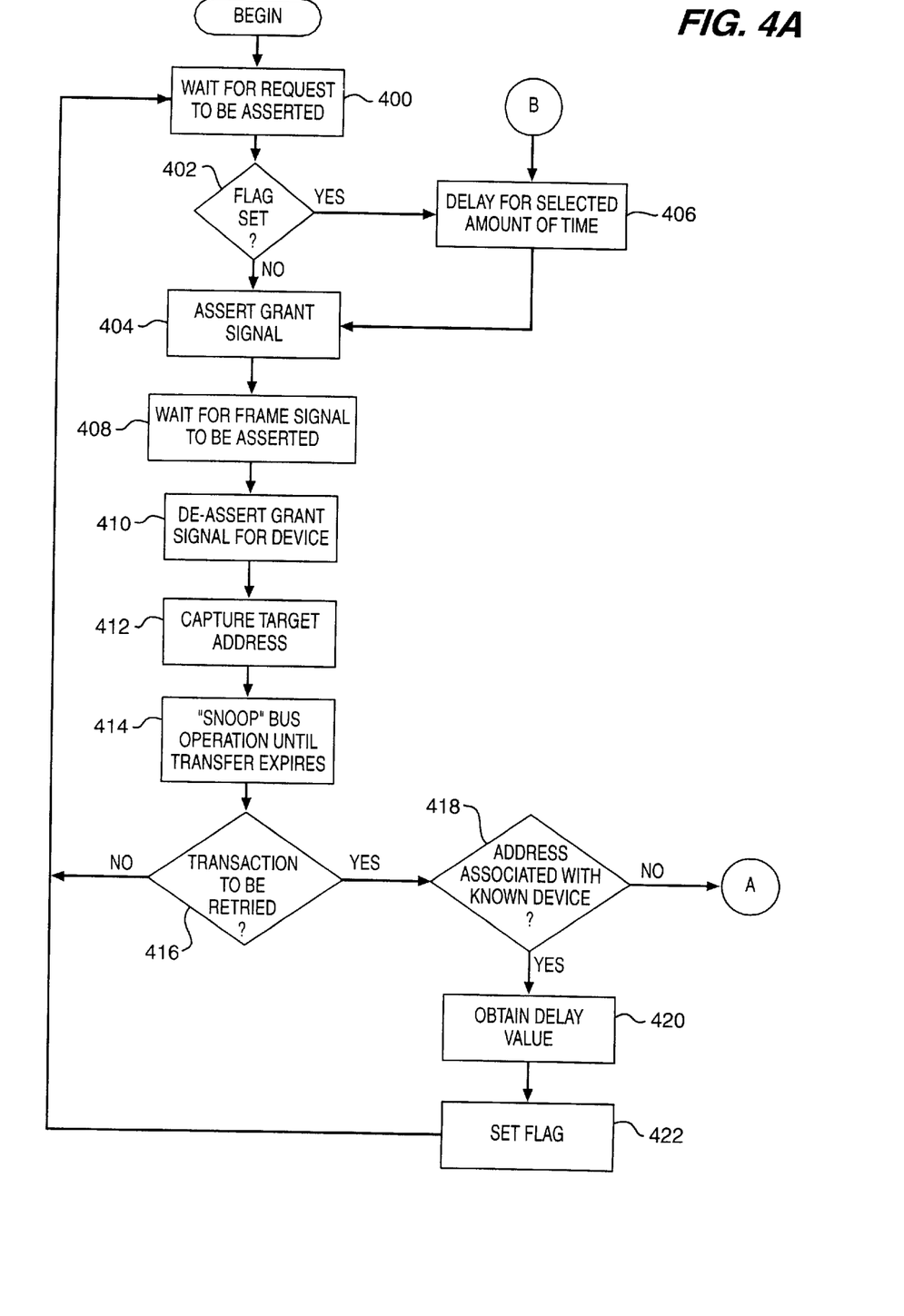
FIGS. 4A and 4B are flowcharts of a process for arbitrating bus request according to the present invention.
Figure 4B:
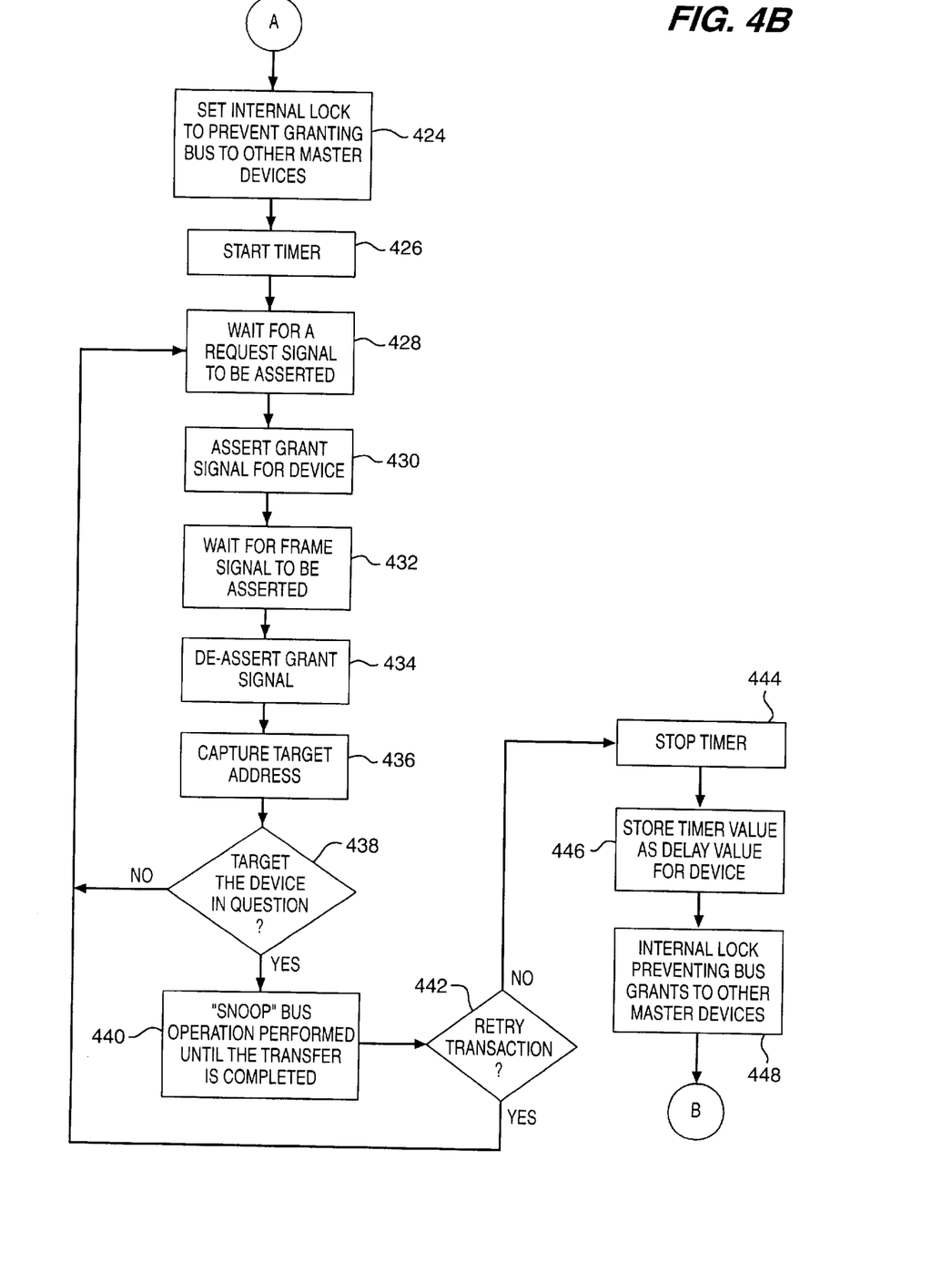

With reference now to FIGS. 4A and 4B, a flowchart of a process for arbitrating bus request is depicted according to the present invention. The process begins by waiting for a request to be asserted on the bus (step 400). The process then determines whether a flag has been set (step 402). If a flag has not been set, the process asserts a grant signal to the device asserting the request (step 404).

With reference again to step 402, if a flag has been set, a delay occurs for the amount of time associated with the target device (step 406). The amount of time is the delay value. Thereafter, the process proceeds to step 404 as previously described. The process then waits for a frame signal to be asserted on the bus, signifying that the granted device has taken ownership of the bus (step 408). After a frame signal has been asserted, the grant signal is de-asserted for the device (step 410). The process then captures the target address (step 412). The process monitors or "snoops" the bus until the transfer of data is completed (step 414). The state of the bus upon such completion indicates whether the data was successfully transferred or whether the transaction is to be retried (step 416). If the transaction is not be retried, the process returns to step 400. Otherwise, a determination is made as to whether the target address is associated with a device whose period of unavailability is already known (step 418). If the target address is associated with a known device, the device's delay value is obtained (step 420). Thereafter, a flag is set indicating that the current master device should be delayed (step 422) with the process then returning to step 400.

With reference again to step 418, if the target address is not associated with a device whose period of unavailability is already known, the process proceeds to determine the period of unavailability. The process sets an internal lock to prevent the arbiter from granting the bus to other master devices (step 424). Thereafter, a timer is started (step 426). The process waits for a request signal to be asserted by the current master device (step 428). After a request signal is asserted, a grant signal is asserted for the current master device (step 430). The process then waits for a frame signal to be asserted signifying that the granted device has taken ownership of the bus (step 432), and the grant signal is de-asserted for the device (step 434).

Next, the target address is captured (step 436). Using the target address, a determination is then made as to whether the target is the device in question (step 438). If the device is the target in question, the process monitors or "snoops" the bus until the transfer is completed (step 440). Thereafter, the process determines whether the transaction is retried (step 442). If the transaction is retried, the process then returns to step 428 as described above. The process also returns to step 428 from step 438 if the target is not the device in question.

With reference again to step 442, if the transaction is not retried, the timer is stopped (step 444), and the timer value is stored as a delay value for the device in question (step 446). The process then clears the internal lock, preventing bus grants to other master devices (step 448) with process returning to step 406.

According to the present invention, the processes depicted in FIGS. 4A and 4B do not have to be applied to all devices requiring a retry of a data transfer. The processes of the present invention may be applied to devices having an "unacceptable period of unavailability", which is some length of time during which repeated attempts to access the device will be unsuccessful and serve only to reduce the available bus bandwidth. Thus, in some cases, only some devices that require data transactions to be retried will require delays and determination of values for delay, as depicted in FIGS. 4A and 4B. In other cases, all devices requiring a transaction to be retried will require processing as described in FIGS. 4A and 4B.

Figure 5:
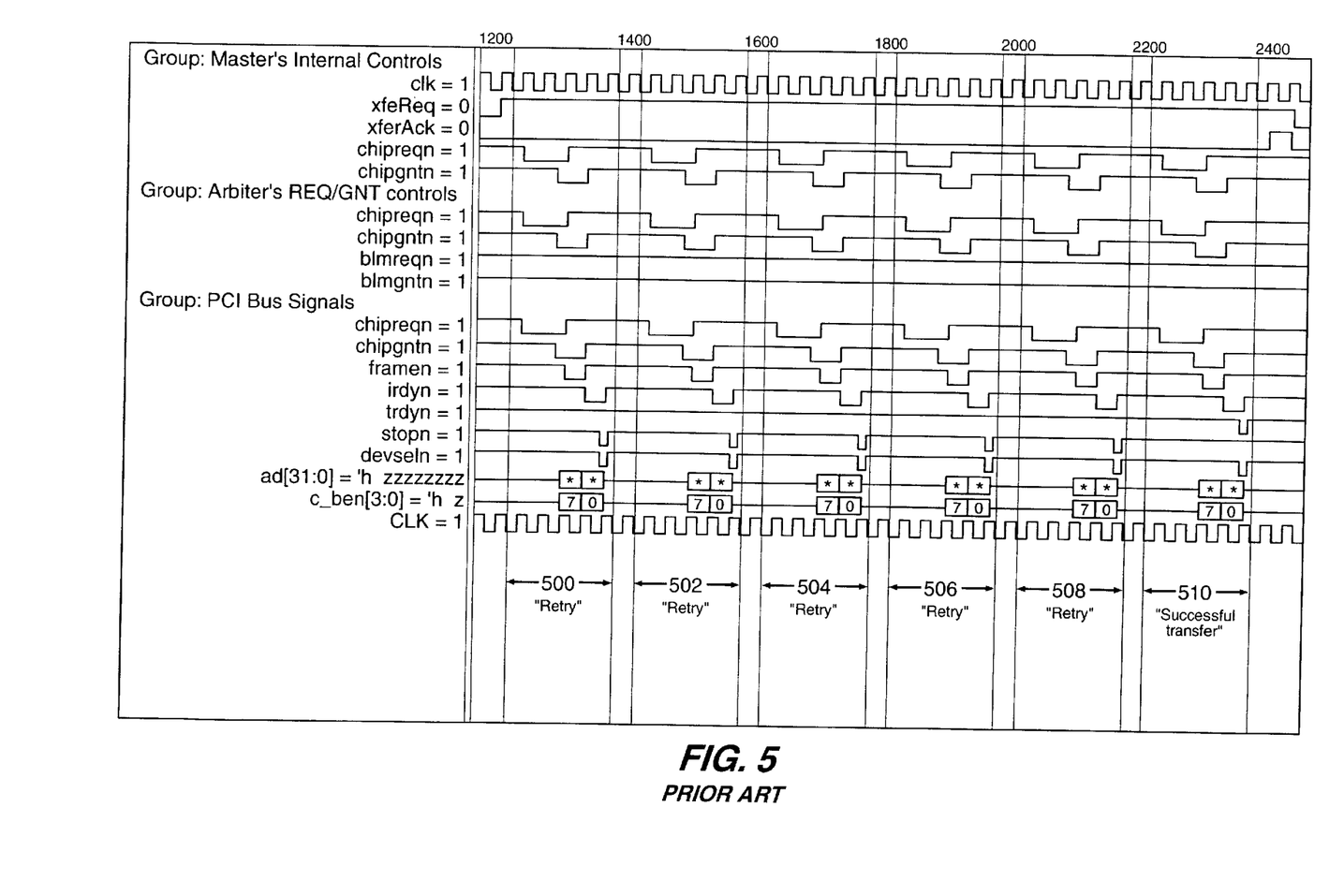
FIG. 5 is a timing diagram illustrating behavior of a prior art arbiter.
Figure 6:
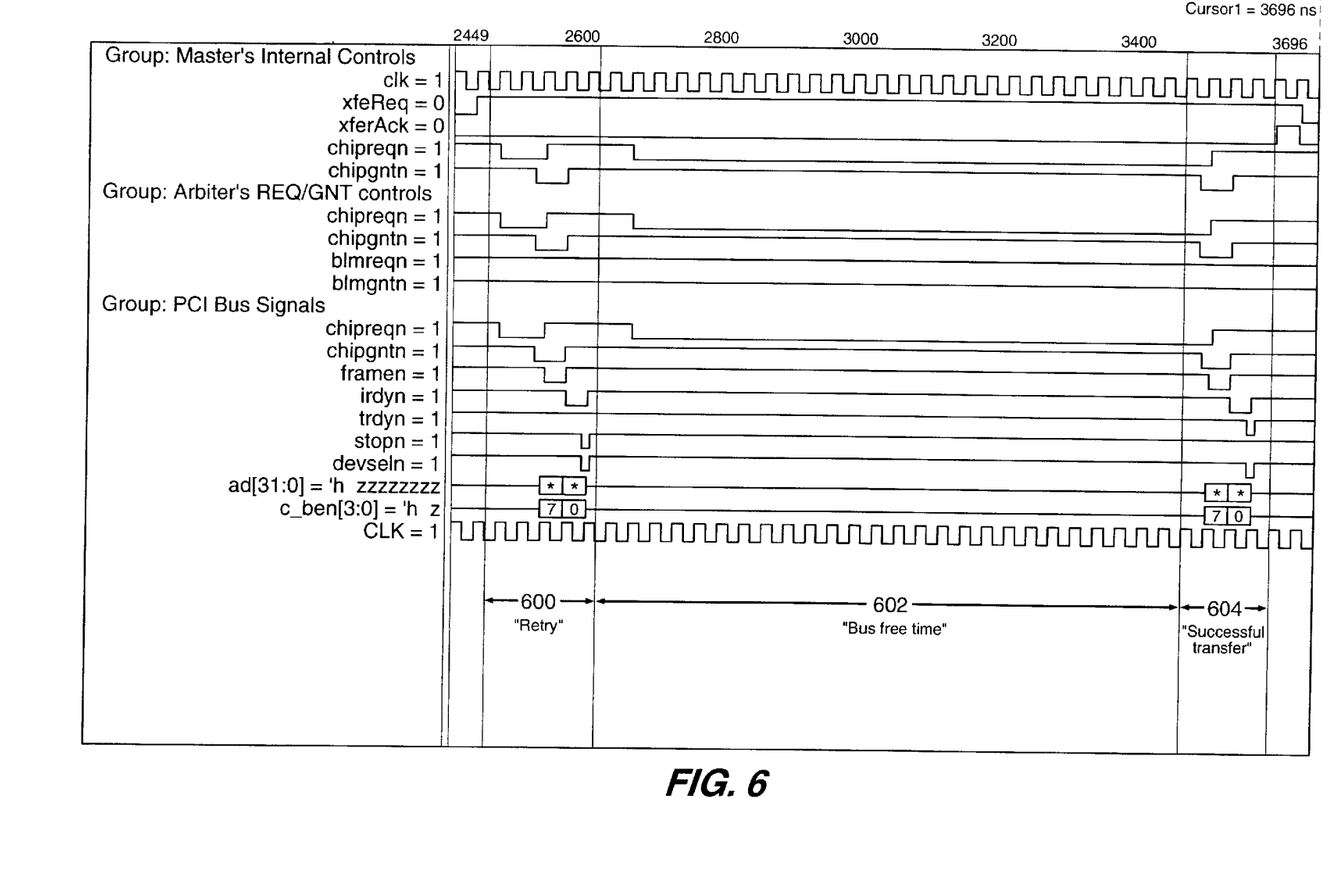
FIGS. 6–7 are timing diagrams illustrating the behavior of an arbiter according to the present invention.
Figure 7:
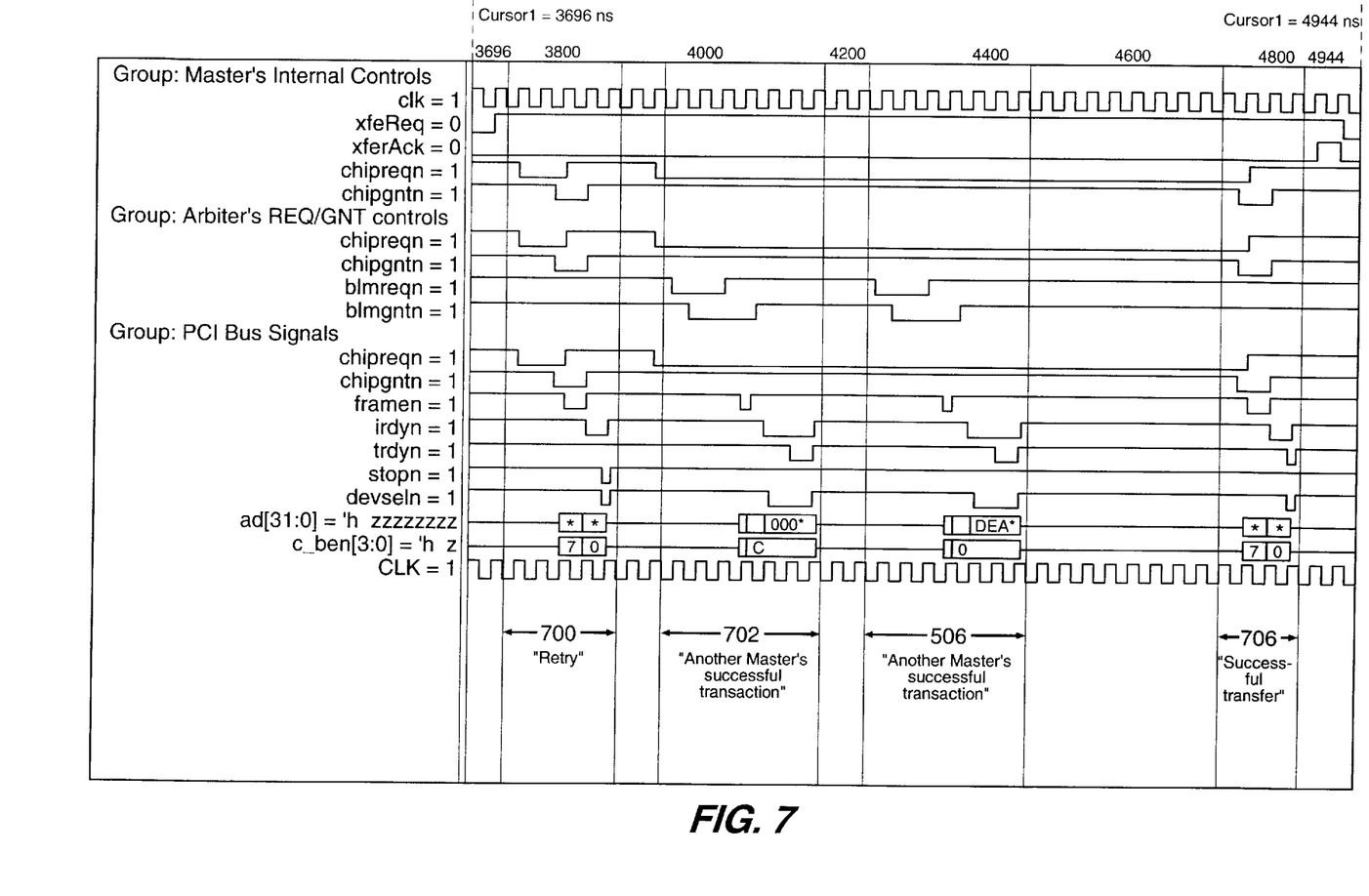

With reference now to FIGS. 5–7, a timing diagram depicting behavior of a prior art arbiter is depicted in FIG. 5, and timing diagrams illustrating the behavior of an arbiter according to the present invention are shown in FIGS. 6–7. In FIGS. 5–7, three groups of signals are depicted: master device internal control signals, arbiter's request/grant control signals, and PCI bus signals. The following signals are signals received and sent by the master device:

clk—a clock signal which is common to all devices on the bus and is used by the master device to drive operations in the master device.

xferReq—a transfer request signal used by the master device to indicate the beginning of a data transfer.

xferAck—indicates a successful transfer of data.

chipregn—a signal asserted by the master device to request the bus from the arbiter.

chipgntn—a signal sent to the master device indicating that the master device has been granted control of the bus.

The following are request and grant control signals in the arbiter:

chipreqn—a signal asserted by the master device to request the bus from the arbiter.

chipgntn—a signal sent to the master device from the arbiter, indicating that the master device has been granted control of the bus.

blmreqn—a request signal from another master device wishing to assert control of the bus.

blmgntn—a grant signal sent by the arbiter to grant control of the bus to another master device.

The following are PCI bus signals:

chipregn—a signal asserted by the master device to request the bus from the arbiter.

chipgntn—a signal sent to the master device indicating that the master device has been granted control of the bus.

framen—a signal driven by the current master device to indicate the beginning and duration of an access to the bus. This signal is asserted to indicate a bus transaction is beginning. When this signal is de-asserted, the transaction is in the final data phase or has been completed.

irdyn—an indicator ready signal indicating the initiating agent's (bus master's) ability to complete the current data phase of the transaction.

trdyn—a target ready signal indicating the target agent's (the slave device's) ability to complete the current data phase of the transaction.

stopn—a signal indicating that the current target is requesting the master to stop the current transaction.

devseln—a drive select signal, when actively driven, indicates the driving device has decoded the address as the target of the current access. As an input, this signal indicates whether any device on the bus has been selected.

ad[31:0]—contains addresses and data multiplexed on the same PCI pins.

c_ben[3:0]—contains bus commands and bit enable signals multiplexed on the same PCI pin. During the address phase of a transaction, this signal defines the bus command; and during the data phase, this signal is used as byte enables.

CLK—this clock signal provides timing for all transactions on the PCI bus and is input into every PCI device.

The letter "n" in the signals described above (i.e., framen), signifies a negative assertion (logic level 0 is the asserted state). The various signals depicted in the timing diagrams are signals specified by the PCI Special Interest Group in *PCI Local Bus Specification,* Revision 2.1 (1995). The latest revision of the PCI local bus specification may be obtained from the PCI Special Interest Group, P.O. Box 14070, Portland, Oreg. 97214.

With reference to FIG. 5, a single request for transfer handled by an arbiter in a conventional prior art arbitration system is illustrated. In FIG. 5, a single request for transfer is depicted in which the target device is unavailable for a long amount of time.

Data transfers occur when both irdyn and trdyn are low. If trdyn is high and stopn and devseln are low, a retry occurs. The master device puts out the request signal chipreqn and receives the grant signal chipgntn. In the example depicted in FIG. 5, the master tries and retries five times (see time periods 500, 502, 504, 506, 508) before finally succeeding in transferring the data between the master device and the slave device, as illustrated in a successful transfer during time period 510.

Turning now to FIG. 6, a timing diagram of bus arbitration is depicted according to the present invention. This timing diagram shows the arbiter providing the master device access to the bus, with the slave device (also called the target device) indicating that it is not ready. The master device generates a retry, as seen in time period 600. In this depicted example, the arbiter recognizes that the target device is typically unavailable for some set amount of time. As a result, the arbiter does not grant the master device access to the bus for a period of time previously associated with the target device, thus freeing the bus during time period 602. In FIG. 6, the second time the arbiter grants the master device access to the bus, the target device is ready and the data transfer occurs, as depicted in time period 604.

In FIG. 7, the timing diagram depicts two master devices (chip and blm) requesting access to the bus. As can be seen, the first master device (chip) is granted access to the bus, but the target device is not ready and generates a retry, as illustrated in retry period 700. The arbiter recognizes that this target device is one that has a long period of unavailability. As with the scenario depicted in FIG. 6, the arbiter does not grant the master device asserting the chip request signal, chipreqn, access to the bus for a period of time associated with the target device. During this time between bus grants, another master device (blm), asserting a bus request signal, blmreqn, requests the bus and is granted access by the arbiter. This second master device transfers data between it and another target device on the bus during the period of time the first target device is unavailable and during which the first master device is not granted access to the bus, as depicted in time periods 702 and 704.

As can be seen, the control of bus grants based on identifying how long particular target devices are unavailable allows better use of the potential bandwidth of a PCI bus, with three successful transfers taking place in time periods 702, 704, and 706. If the first master device is allowed to continue retrying data transfers and the arbiter continue to grant it access to the bus as in the prior art depicted in FIG. 5, the second master device would be delayed, potentially to the point of being unable to complete a data transfer until the first master device finished its data transfer. In such a situation, a successful data transfer by the first master device would occur only in time period 706 and data transfers by the second master device would not occur in time periods 702 and 704.

As a result, the present invention provides an improved method and apparatus for arbitrating bus requests by identifying devices that have reoccurring periods of unavailability in response to requests from master devices. The present invention provides the improved arbitration scheme by identifying these types of devices and delays bus grants to the master device such that retries occur when the target device is available. The delay is based on the amount of time that the target device is unavailable. This amount of time may be determined either by using pre-existing data or by building a statistical database based on observations of the target device as illustrated in FIG. 4B. In this manner, high performance buses do not become bandwidth limited because while one master device is prevented from retrying a transaction, other transactions by other master devices may occur.

Thus, the present invention provides an improved bus arbitration system, especially for multi-initiator systems in which bandwidth can be utilized by other master devices since retries to a device having a known unavailability are delayed until the device is again available. As a result, the present invention eliminates many unnecessary retries and reclaims bus bandwidth.

While the invention has been particularly shown and described with reference to a preferred embodiment, it will be understood by those skilled in the art that various changes in form and detail may be made therein without departing from the spirit and scope of the invention.

What is claimed is:

1. A method for controlling access to a bus comprising:

identifying a target device having an unacceptable period of unavailability;

identifying a master device requesting access to the bus to initiate a data transfer between the master device and the identified target device; and denying the master device access to the bus for a delay period in response to the master device attempting to retry the data transfer with the target device, wherein the delay period is a time period after which the target device becomes available for additional transfers, wherein the bus is available to other master devices during the delay period.

2. A method for controlling access to a bus comprising:

identifying a target device having an unacceptable period of unavailability, wherein the step of identifying a target device comprises comparing the target device to a list of target devices previously identified as having a period of unacceptable availability when a data transfer retry is initiated;

identifying a master device requesting access to the bus to initiate a data transfer between the master device and the identified target device; and denying the master device access to the bus for a delay period in response to the master device attempting to retry the data transfer with the target device, wherein the delay period is a time period after which the target device becomes available for additional transfers, wherein the bus is available to other master devices during the delay period.

3. A method for controlling access to a bus comprising:

identifying a target device having an unacceptable period of unavailability, wherein the step of identifying the target device further includes:

starting a timer in response to the master device requesting access to the bus to retry the data transfer;

stopping the timer in response to a successful data transfer between the target device and the master device; and storing an identification of the target device and a value of the timer as a delay value for the identified target device;

identifying a master device requesting access to the bus to initiate a data transfer between the master device and the identified target device; and denying the master device access to the bus for a delay period in response to the master device attempting to retry the data transfer with the target device, wherein the delay period is a time period after which the target device becomes available for additional transfers, wherein the bus is available to other master devices during the delay period.

4. A data processing system comprising:

a bus;

a plurality of master devices connected to the bus;

a plurality of slave devices connected to the bus;

granting means for granting access to the bus in response to a request for access from a master device within the plurality of master devices;

identification means, responsive to the master device requesting access to the bus to retry data transfer with a slave device within the plurality of slave devices, for determining whether the slave device has an unacceptable period of unavailability; and prevention means, responsive to the identification means determining the slave device has an unacceptable period of unavailability, for preventing the granting means from granting the master device access to the bus for a delay period in response to the master device attempting to retry the data transfer with the target device, wherein the delay period is a period of time after which the target becomes available for additional transfers, wherein the bus is available to other master devices during the delay period.

5. The data processing system of claim 4, wherein the granting means, identification means, and the prevention means are located in a processor.

6. The data processing system of claim 4, wherein data identifying slave devices as having an unacceptable period of delay are stored in a storage device connected to the processor.

7. A data processing system comprising:

a bus, wherein the bus is a Peripheral Component Interconnect bus;

a plurality of master devices connected to the bus;

a plurality of slave devices connected to the bus;

granting means for granting access to the bus in response to a request for access from a master device within the plurality of master devices;

identification means, responsive to the master device requesting access to the bus to retry data transfer with a slave device within the plurality of slave devices, for determining whether the slave device has an unacceptable period of unavailability; and prevention means, responsive to the identification means determining the slave device has an unacceptable period of unavailability, for preventing the granting means from granting the master device access to the bus until the delay period has expired wherein the bus is available to other master devices during the delay period.

8. An apparatus for controlling access to a bus comprising:

identification means for identifying a plurality of target devices connected to a bus, wherein the identification means comprises means for comparing a target device to a list of target devices previously identified as having a period of unacceptable availability when a data transfer is initiated, wherein the plurality of target devices are identified target devices;

request means for receiving a request from a master device to initiate a data transfer on the bus between the master device and one of the identified target devices;

granting means for granting the master device access to the bus; and prevention means, responsive to the master device attempting to retry a data transfer with the target device, for preventing the granting means from granting the master device access to the bus for a period of time, wherein the bus is available to other master devices during the period of time.

9. The apparatus of claim 8, wherein the identification means further includes:

first timer means for starting a timer in response to the master device requesting access to the bus to retry the data transfer;

second timer means for stopping the timer in response to a successful data transfer between the target device and the master device in which no retry of the data transfer is required; and storage means for storing an identification of the target device in the list of target devices and a value of the timer as a delay value for the identified target device.

10. The apparatus of claim 8, wherein the apparatus is a processor.

11. An apparatus for controlling access to a bus comprising:

identification means for identifying a plurality of target devices connected to a bus;

request means for receiving a request from a master device to initiate a data transfer on the bus between the master device and one of the identified target devices;

granting means for granting the master device access to the bus; and prevention means, responsive to the master device attempting to retry a data transfer with the target device, for preventing the granting means from granting the master device access to the bus for a period of time, wherein the bus is available to other master devices during the period of time, wherein the apparatus is an application specific integrated chip adapted for connection to the bus.

12. An arbiter for controlling access to a bus comprising:

an interface adapted for connection to a bus; and a processor having a plurality of modes of operation including:

a first mode of operation in which the processor receives a request from a master device requesting access to the bus to initiate a data transfer between the master device and a target device;

a second mode of operation in which the processor grants the master device access to the bus in response to the request received in the first mode of operation;

a third mode of operation in which the processor receives a request from the master device to access the bus to retry the data transfer with the target device;

a fourth mode of operation in which the processor denies the master device access to the bus for a delay period in response to receiving the request in the third mode of operation, wherein the master device is denied access for the delay period; and a fifth mode of operation in which the processor grants the master device access to the bus after the delay period has expired.

13. The arbiter of claim 12, wherein the plurality of modes of operation further includes a sixth mode of operation in which the processor grants access to other master devices during the delay period in the fourth mode of operation.

14. The arbiter of claim 13, wherein the plurality of modes of operation further comprises:

a seventh mode of operation in which the master device requests access to the bus to retry a data transfer with a target device, wherein the target device does not have a delay period associated with it; and an eighth mode of operation, responsive to the sixth mode of operation, in which the processor starts a timer in response to the master device requesting access to the bus to retry the data transfer, stops the timer in response to a successful data transfer between the target device and the master device in which no further retries to transfer data are required, and stores the identification of the target device value and a value of the timer as a delay value of the identified target device.

15. The arbiter of claim 14, wherein the identification of the target device and the delay value are stored in a storage device.

16. A data processing system comprising:

a bus;

a plurality of master devices connected to the bus;

a plurality of slave devices connected to the bus; and an arbiter having a plurality of modes of operation including:
- a first mode of operation in which the processor receives a request from a master device requesting access to the bus to initiate a data transfer between the master device and a target device;
- a second mode of operation in which the processor grants the master device access to the bus in response to the request received in the first mode of operation;
- a third mode of operation in which the processor receives a request from the master device to access the bus to retry the data transfer with the target device;
- a fourth mode of operation in which the processor denies the master device access to the bus for a delay period in response to receiving the request in the third mode of operation, wherein the master device is denied access for the delay period; and
- a fifth mode of operation in which the processor grants the master device access to the bus after the delay period has expired.

17. The data processing system of claim 16, wherein the plurality of modes of operation further includes a sixth mode of operation in which the processor grants access to other master devices during the delay period in the fourth mode of operation.

18. The data processing system of claim 16, wherein the plurality of modes of operation further comprises:

a seventh mode of operation in which the master device requests access to the bus to retry a data transfer with a target device, wherein the target device does not have a delay period associated with it; and an eighth mode of operation, responsive to the sixth mode of operation, in which the processor starts a timer in response to the master device requesting access to the bus to retry the data transfer, stops the timer in response to a successful data transfer between the target device and the master device in which no further retries to transfer data are required, and stores the identification of the target device value and a value of the timer as a delay value of the identified target device.

19. The data processing system of claim 16, wherein the arbiter is a processor.

20. The data processing system of claim 16, wherein the arbiter is an application specific integrated chip adapted for connection to the bus.

* * * * *